Patented Oct. 7, 1952

2,613,188

UNITED STATES PATENT OFFICE 2,613,188

PREPARATION OF A SUPPORTED H₃PO₄ CATALYST

Julian M. Mavity, Hinsdale, Ill., assignor to Universal Oil Products Company, Chicago, Ill., a corporation of Delaware No Drawing. Application June 14, 1949, Serial No. 99,123

10 Claims. (Cl. 252—435)

1

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefin polymerization reactions, in its stability in service, and in its relatively low corrosive properties when employed in ordinary commercial apparatus comprising various types of steel.

An object of this invention is a method of producing a hydrocarbon conversion catalyst which has a high resistance to crushing during use.

Another object of this invention is a highly active catalyst suitable for use in the polymerization of olefinic hydrocarbons and in other hydrocarbon conversion reactions involving olefins.

One specific embodiment of this invention relates to a process for manufacturing a solid catalyst which comprises mixing a phosphoric acid, a siliceous adsorbent, and a halogen-containing silicon compound to form a composite, and calcining said composite.

Another embodiment of this invention relates to a process for manufacturing a solid catalyst which comprises mixing a phosphoric acid, a siliceous adsorbent, and a chlorine-containing silicon compound to form a composite, and calcining said composite.

A further embodiment of this invention relates to a process for manufacturing a solid catalyst which comprises mixing a phosphoric acid, a siliceous adsorbent, and a silicon polychloride to form a composite, and calcining said composite.

An additional embodiment of this invention relates to a process for manufacturing a solid catalyst which comprises mixing a polyphosphoric acid, diatomaceous earth, and silicon tetrachloride to form a composite, and calcining said composite.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any

2 of the other acids of phosphorus insofar as they are adaptable. It is not intended to infer, however, that the different acids of phosphorus, which may be employed will produce catalysts which have identical effects upon any given reactions as each of the catalysts produced from different acids and by slightly varied procedure will exert its own characteristic action.

In using orthophosphoric acid as a primary ingredient, different concentrations of the aqueous solution may be employed from approximately 75 to 100% or acid containing some free phosphorus pentoxide may even be used. By this is meant that the ortho acid may contain a definite percentage of the pyro acid corresponding to the primary phase of dehydration of the orthophosphoric acid. Within these concentration ranges, the acids will be liquids of varying viscosities, and readily mixed with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures or to mixtures of other polyphosphoric acids and siliceous adsorbents may be different from that used when the ortho acid is employed.

Triphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$, which corresponds to the double oxide formula $3H_2O \cdot 2P_2O_5$, which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperatures, the crystals of the tetraphosphoric acid separate from the viscous liquid and it is found that these crystals melt at approximately 93° F. and have a specific gravity of 1.1886, at a temperature of 60° F. However, it is unnecessary to crystallize the tetraphosphoric acid before employing it in the preparation of the solid catalyst inasmuch as the crude tetraphosphoric acid mixture may be incorporated with the siliceous adsorbent and other catalyst ingredient.

The materials which may be employed as adsorbents or carriers for acids of phosphorus are divided roughly into two classes. The first class comprises materials of predominantly siliceous character and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of other members of the class.

The halogen containing silicon compounds which are used as modifying and strengthening agents in my catalyst production method include particularly the chlorine and bromine compounds of silicon. These halogen-containing silicon compounds include silicon tribromide, silicon tetrabromide, silicon bromohydride, silicon bromotrichloride, silicon dibromodichloride, silicon tribromochloride, and also silicon tetrachloride, silicon trichloride, silicon chlorohydride, trichlorosilane, dichlorodimethylsilane, and other haloalkyl silanes in which a silicon atom is bound to at least one halogen atom and one or more alkyl group.

Other halogen-containing compounds which may be used include those containing silicon, halogen, oxygen and alkyl groups, and having the general formula $SiX_n(OR)_{4-n}$ in which R represents an alkyl group generally having from one to about five carbon atoms, X represents a halogen atom, preferably bromine or chlorine, and $n$ is an integer from 1 to 3, inclusive.

The starting materials mentioned above which are used in this catalyst preparation process are first mixed in any order, but preferably by adding the halogen-containing silicon compound to the diatomaceous earth or other siliceous adsorbent and then the mixture of siliceous adsorbent and halogen-containing silicon compound is added to the phosphoric acid which is generally maintained at a temperature of from about 50° to about 450° F. and preferably at a temperature of from about 200° to about 350° F., while the dry ingredients are added thereto with stirring. Also the halogen-containing silicon compound may be added first to the phosphoric acid and then the siliceous adsorbent may be added to the phosphoric acid layer containing the halogen-containing silicon compound.

The resultant aggregate of the phosphoric acid, siliceous adsorbent and other silicon compound containing halogen is a slightly moist to almost dry material which, upon being compressed, becomes sufficiently plastic that it may be formed into shaped particles by extrusion or other suitable means and the resultant particles are then calcined at a temperature of from about 200° to about 1000° F. for a time of from about 0.25 to about 10 hours to form a substantially solid material. The calcination treatment may be carried out by heating the catalyst particles in a substantially inert gas such as air, nitrogen, and the like.

The resultant catalyst which has been calcined is active for promoting polymerization of olefinic hydrocarbons, particularly normally gaseous olefinic hydrocarbons, to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions, suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of about 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

In utilizing the catalysts of this invention for promoting miscellaneous organic reactions, the catalysts may be employed in essentially the same way as they are used when polymerizing olefins, in case the reactions are essentially vapor phase and they may be employed, in suspension, also in liquid phase in various types of equipment.

With suitable modifications in the details of operation, the present type of catalyst may be employed in a large number of organic reactions, including polymerization of olefins as already mentioned. Typical cases of reaction in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydro-halogenation of unsaturated organic compounds, isomerization reactions, ester formation by the interaction of carboxylic acids and olefins and the like. The specific procedure for utilizing the present type of catalyst in miscellaneous organic reactions will be determined by the chemical and physical characteristics and the phase of the reacting constituents.

During use of these catalysts in vapor phase polymerization and other vapor phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activities during polymerization use and also suffer a marked decrease in crushing strength due to softening of the catalyst. Such softening of the catalyst also results in short catalyst life inasmuch as the catalyst towers become plugged during use. I have found, however, that catalysts of high crushing strength may be produced by adding to the composite of phosphoric acid and diatomaceous earth a relatively small amount of a halogen-containing silicon compound and preferably of a chlorine containing silicon compound which is generally added in an amount of not more than about 10% by weight and preferably from about 0.5 to about 5% by weight of the catalyst mixture. Such a catalyst containing a halogen compound of silicon also has a good crushing strength after it has been used in the polymerization reaction. Pyrophosphoric acid-diatomaceous earth catalyst to which the above indicated amounts of a halogen-containing silicon compound has been added and then the resultant composite has been dried and calcined, have been found to produce catalysts of high crushing strength, said strength being much higher than that of similar catalyst mixtures prepared in the absence of the added halogen-containing silicon compound. These catalysts have been tested in converting propylene into propylene polymers in rotatable steel autoclaves and have been found to retain this high crushing strength after such polymerization use in which from about 30 to about 45% by weight of the propylene charged has been converted into liquid products.

Accordingly the process for making a solid catalyst according to this invention comprises mixing from about 50 to about 75% by weight of a phosphoric acid, from about 15 to about 49.5% by weight of diatomaceous earth, and from about 0.5 to about 10% by weight of a silicon polyhalide in which the halogen has an atomic weight of from about 35 to about 80 at a temperature of from about 50° to about 450° F. to form a composite, shaping said composite into particles, drying said particles at a temperature of from about 200° to about 500° F. and calcining the dried particles at a temperature of from about 500° to about 1000° F. for a time of from about 0.25 to about 10 hours.

The following examples of the preparation of catalysts comprised within the scope of this invention and the results obtained in their use for catalyzing the polymerization of propylene are characteristic, although the exact details set forth in these examples are not to be construed as imposing undue limitation upon the generally broad scope of the invention.

To an intimate mixture of 30.3 grams of diatomaceous earth and 104.3 grams of phosphoric acid of 85.7% by weight $H_3PO_4$ concentration, contained in a porcelain dish, was added 17.6 grams of silicon tetrachloride. The silicon tetrachloride tended to remain as a separate phase but after being worked with a stirrer for some time, it blended into the other mixture to form a paste-like mass. The paste-like mass was kept at room temperature for a week during which time it was protected by a Dry Ice reflux system to prevent any loss of silicon tetrachloride through volatilization. This reflux system was apparently unnecessary since no reflux liquid was observed. The resultant paste-like material was then heated slowly in the open dish under a heat lamp until the mass had a consistency suitable for extrusion. The extruded material was cut in the form of 5 x 5 mm. pellets and these were dried for one hour at a temperature of 392° F. The dried catalyst particles were then divided into two parts and calcined, one part at a temperature of 680° F. for one hour and the other part at a temperature of 860° F. also for one hour. The catalyst which had been calcined at a temperature of 680° F. had an average bulk density of 0.80 and an activity corresponding to 29% polymerization of the propylene from the propane-propylene mixture charged to the rotatable steel autoclave and heated at 450° F. for a period of two hours, in the presence of 10 grams of the pelleted catalyst. This catalyst had a crushing strength before use of 22.7 pounds and an after use crushing strength of 22.9 pounds. The other catalyst sample which had been calcined for one hour at a temperature of 860° F. had an average bulk density of 0.76, it catalyzed the polymerization of 44% by weight of the propylene present in the autoclave, and also had a before use crushing strength of 25.4 pounds and after use crushing strength of 26.3 pounds.

A catalyst similarly prepared from pyrophosphoric acid and diatomaceous earth but containing no added halogen-containing silicon compound was calcined at a temperature of 860° F. for one hour. The resultant diatomaceous earth-pyrophosphoric acid catalyst converted 48% of the propylene into liquid polymers during one hour in the autoclave test, this catalyst had a before use crushing strength of 16 pounds and an after use crushing strength of 9 pounds, which is considerably lower than the after use crushing strength of the catalyst formed by this process from a composite containing silicon tetrachloride.

I claim as my invention:

1. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a halogen-containing silicon compound to form a composite, and calcining said composite.

2. The process of claim 1 further characterized in that the halogen of said silicon compound comprises chlorine.

3. The process of claim 1 further characterized in that said halogen-containing compound is a silicon polyhalide.

4. The process of claim 1 further characterized in that said halogen-containing compound is a silicon polychloride.

5. The process of claim 1 further characterized in that said halogen-containing compound is silicon tetrachloride.

6. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a halogen-containing silicon compound to form a composite, and calcining said composite at a temperature of from about 200° to about 1000° F.

7. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a halogen-containing silicon compound to form a composite, and calcining said composite at a temperature of from about 200° F. to about 1000° F. for a time of from about 0.25 to about 10 hours.

8. A process for manufacturing a solid catalyst which comprises mixing from about 50 to about 75% by weight of a phosphoric acid, from about 15 to about 49.5% by weight of a siliceous adsorbent, and from about 0.5 to about 10% by weight of a halogen-containing silicon compound to form a composite, shaping said composite into particles, and calcining said particles at a temperature of from about 200° to about 1000° F. for a time of from about 0.25 to about 10 hours.

9. A process for manufacturing a solid catalyst which comprises mixing from about 50 to about 75% by weight of a phosphoric acid, from about 15 to about 49.5% by weight of diatomaceous earth, and from about 0.5 to about 10% by weight of a silicon polyhalide in which the halogen has an atomic weight of from about 35 to about 80 at a temperature of from about 50° to about 450° F. to form a composite, shaping said composite into particles, and calcining said particles at a temperature of from about 200° to about 1000° F. for a time of from about 0.25 to about 10 hours.

10. A process for manufacturing a solid catalyst which comprises mixing from about 50 to about 75% by weight of a phosphoric acid, from about 15 to about 49.5% by weight of diatomaceous earth and from about 0.5 to about 10% by weight of silicon tetrachloride to form a composite, shaping said composite into particles, and calcining said particles at a temperature of from about 200° to about 1000° F. for a time of from about 0.25 to about 10 hours.

JULIAN M. MAVITY.

REFERENCES CITED

The following references are of record in the file of this patent:

UNITED STATES PATENTS

| Number | Name | Date |
| --- | --- | --- |
| 2,030,048 | Brown | Feb. 11, 1936 |
| 2,120,723 | Watson | June 14, 1938 |
| 2,231,452 | Morrell | Feb. 11, 1941 |
| 2,315,024 | Sturgeon | Mar. 30, 1943 |
| 2,324,079 | Greger | July 13, 1943 |
| 2,347,955 | Korpi | May 2, 1944 |
| 2,400,621 | Alther | May 21, 1946 |
| 2,406,954 | Linn | Sept. 3, 1946 |
| 2,441,214 | Thomas et al. | May 11, 1948 |
| 2,446,619 | Stewart et al. | Aug. 10, 1948 |
| 2,488,449 | Trautman | Nov. 15, 1949 |